(12) United States Patent
Eickemeyer et al.

(10) Patent No.: US 10,353,710 B2
(45) Date of Patent: Jul. 16, 2019

(54) TECHNIQUES FOR PREDICTING A TARGET ADDRESS OF AN INDIRECT BRANCH INSTRUCTION

(71) Applicant: INTERNATIONAL BUSINESS MACHINES CORPORATION, Armonk, NY (US)

(72) Inventors: Richard J. Eickemeyer, Rochester, MN (US); Naga P. Gorti, Austin, TX (US); David S. Levitan, Austin, TX (US); Albert J. Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 15/141,112

(22) Filed: Apr. 28, 2016

(65) Prior Publication Data

US 2017/0315810 A1   Nov. 2, 2017

(51) Int. Cl.
*G06F 9/30* (2018.01)
*G06F 9/32* (2018.01)
(Continued)

(52) U.S. Cl.
CPC ...... *G06F 9/30058* (2013.01); *G06F 9/30054* (2013.01); *G06F 9/322* (2013.01);
(Continued)

(58) Field of Classification Search
CPC .. G06F 9/30058; G06F 9/30054; G06F 9/322; G06F 9/3806
(Continued)

(56) References Cited

U.S. PATENT DOCUMENTS 6,721,876 B1 * 4/2004 Chen ............... G06F 9/3806
712/239
6,721,877 B1 * 4/2004 Chen ............... G06F 9/3806
712/239
(Continued)

OTHER PUBLICATIONS

Xie et al., "TAP Prediction: Reusing Conditional Branch Predictor for Indirect Branches with Target Address Pointers," 2011 IEEE 29th Int'l. Conf. on Computer Design (ICCD), IEEE, 2011, pp. 119-126.
(Continued)

*Primary Examiner* — Yuqing Xiao
(74) *Attorney, Agent, or Firm* — Michael R. Long; Jason Sosa

(57) ABSTRACT

A technique for operating a processor includes identifying a difficult branch instruction (branch) whose target address (target) has been mispredicted multiple times. Information about the branch (which includes a current target and a next target) is learned and stored in a data structure. In response to the branch executing subsequent to the storing, whether a branch target of the branch corresponds to the current target in the data structure is determined. In response to the branch target of the branch corresponding to the current target of the branch in the data structure, the next target of the branch that is associated with the current target of the branch in the data structure is determined. In response to detecting that a next instance of the branch has been fetched, the next target of the branch is utilized as the predicted target for execution of the next instance of the branch.

12 Claims, 10 Drawing Sheets

(51) Int. Cl.
*G06F 9/38* (2018.01)
*G06F 12/0875* (2016.01)

(52) U.S. Cl.
CPC ........ *G06F 9/3806* (2013.01); *G06F 12/0875* (2013.01); *G06F 2212/452* (2013.01)

(58) Field of Classification Search
USPC .......................................................... 712/238
See application file for complete search history.

(56) References Cited

U.S. PATENT DOCUMENTS

| | | | | |
|---|---|---|---|---|
| 7,870,371 | B2* | 1/2011 | Mutlu | G06F 9/3806 712/233 |
| 9,477,478 | B2* | 10/2016 | Kothari | G06F 9/3806 |
| 2006/0218385 | A1* | 9/2006 | Smith | G06F 9/3806 712/238 |
| 2006/0242393 | A1* | 10/2006 | Park, II | G06F 9/30061 712/240 |
| 2007/0239974 | A1* | 10/2007 | Park, II | G06F 9/3806 712/238 |
| 2008/0256347 | A1* | 10/2008 | Eickemeyer | G06F 9/3848 712/240 |
| 2009/0164766 | A1* | 6/2009 | Suggs | G06F 9/3848 712/240 |
| 2011/0078425 | A1* | 3/2011 | Shah | G06F 9/3806 712/239 |
| 2014/0258696 | A1 | 9/2014 | Manoukian | |
| 2014/0281441 | A1 | 9/2014 | Srikantaiah | |
| 2015/0363201 | A1* | 12/2015 | Eickemeyer | G06F 9/3806 712/239 |

OTHER PUBLICATIONS

Yin et al., "Improve Indirect Branch Prediction with Private Cache in Dynamic Binary Translation," 2012 IEEE 14th Int'l. Conf. on High Performance Computing and Communications, IEEE Computer Society, 2012, pp. 280-286.

Jia Ning et al., "Correlated Software Prediction for Indirect Branch in Dynamic Translation Systems," Computer Research and Development 51.3 (Jan. 1, 2014): 661-671.

Heil et al., "Improving Branch Predictors by Correlating on Data Values," Proc. of the 32nd Annual ACM/IEEE Int'l. Symp. on Microarchitecture, IEEE Computer Society, 1999.

* cited by examiner

Hotness Table 302

| Thread ID | Branch Address | Mispredict Count |
|---|---|---|
| 0 | A | 0 |
| 0 | B | 9 |
| 1 | C | 2 |
| 1 | D | 6 |
| 2 | E | 10 |
| 2 | F | 5 |
| 3 | G | 12 |
| 3 | H | 15 |

FIG. 4

Tracking Table 304

| Hotness value | Address | Pending | Last completed target | Last predicted target | Next target |
|---|---|---|---|---|---|
| 9 | B+ | - | AA | - | EE |
| 10 | E+ | - | BB | - | FF |
| 12 | G+ | - | CC | - | GG |
| 15 | H+ | - | DD | - | HH |

*FIG. 5*

Pattern Cache 306

| Previous tag | Target | Parity | Alt. target hash | Target hit count | Alt. target hit count | Better count |
|---|---|---|---|---|---|---|
| <BB> | FF | - | - | - | - | - |
| | | | | | | |
| | | | | | | |
| | | | ... | | | |
| | | | | | | |
| | | | | | | |
| | | | | | | |

FIG. 6

TECHNIQUES FOR PREDICTING A TARGET ADDRESS OF AN INDIRECT BRANCH INSTRUCTION

BACKGROUND

The present disclosure is generally directed to techniques for predicting a target address of an indirect branch instruction and, more specifically, to techniques for predicting a target address of an indirect branch instruction whose target address is correlated with a target address of a previous instance of the branch instruction.

In general, on-chip parallelism of a processor design may be increased through superscalar techniques that attempt to exploit instruction level parallelism (ILP) and/or through multithreading, which attempts to exploit thread level parallelism (TLP). Superscalar refers to executing multiple instructions at the same time, and multithreading refers to executing instructions from multiple threads within one processor chip at the same time. Simultaneous multithreading (SMT) is a technique for improving the overall efficiency of superscalar processors with hardware multithreading. In general, SMT permits multiple independent threads of execution to better utilize resources provided by modern processor architectures. In SMT processor pipeline stages are time shared between active threads.

In computer science, a thread of execution (or thread) is usually the smallest sequence of programmed instructions that can be managed independently by an operating system (OS) scheduler. A thread is usually considered a light-weight process, and the implementation of threads and processes usually differs between OSs, but in most cases a thread is included within a process. Multiple threads can exist within the same process and share resources, e.g., memory, while different processes usually do not share resources. In a processor with multiple processor cores, each processor core may execute a separate thread simultaneously. In general, a kernel of an OS allows programmers to manipulate threads via a system call interface.

In computer architecture, a branch predictor is usually implemented as logic that predicts a direction of a branch instruction (branch) before the direction is actually known. The purpose of the branch predictor is to improve flow in an instruction pipeline. Two-way branching is usually implemented with a conditional jump instruction (conditional jump). A conditional jump can either be 'not taken' and continue execution with code that immediately follows the conditional jump or can be 'taken' and jump to a different location in program memory where a second branch of code is stored. Whether a conditional jump is 'taken' or 'not taken' is uncertain until a condition associated with the conditional jump is calculated and the conditional jump has passed the execution stage in the instruction pipeline. Without branch prediction, a processor would be required to wait until a conditional jump had passed an execute stage before a next instruction could enter a fetch stage of a processor pipeline. The branch predictor attempts to improve processor efficiency by predicting whether a conditional jump is 'taken' or 'not taken'. The branch that is predicted is then fetched and speculatively executed. If the prediction is wrong then the speculatively executed or partially executed instructions are flushed from a processor pipeline and the pipeline starts over, incurring a delay.

The first time a conditional jump instruction is encountered there is little information on which to base a prediction. Branch predictors are usually configured to build a history of whether branches are 'taken' or 'not taken' to facilitate prediction. A branch predictor may, for example, recognize that a conditional jump is taken more often than not, or that the conditional jump is taken every 'n' times the conditional jump is encountered (where 'n' is equal to 2, 3, 4, . . . ). Branch prediction is not the same as branch target prediction. Branch prediction predicts whether a conditional jump will be 'taken' or 'not taken'. Branch target prediction attempts to guess a target of a taken conditional or unconditional jump before it is computed by decoding and executing the jump. Branch prediction and branch target prediction are often combined into the same logic.

A branch instruction (branch) may be a direct branch or an indirect branch. For a direct branch, a target address (target) of the direct branch is calculated by adding/subtracting an immediate field of the direct branch to/from an address of the branch. In contrast, for an indirect branch a target is based on data in a register. As one example, an indirect branch that functions as a subroutine return may use a link register to provide an indirect branch target. When a calling instruction calls a subroutine the link register stores an address of an instruction that is to be executed following execution of the calling instruction. That is, the link register points to the instruction that is to be executed after a program returns from a currently executed subroutine. In a typical implementation, the link register is a single register that is updated on a subroutine call (e.g., a branch and link (BL) instruction or a branch conditional and link (BCL) instruction) with an address of an instruction following the branch.

If subroutine calls are nested then an address in the link register is saved before a next level of subroutine is called. For a return that is not at a last nesting level, software restores the link register before returning to a caller. In a typical implementation, a hardware link stack is implemented in which addresses are pushed from the link register on a subroutine call and pulled into the link register on a subroutine return. In this manner, the link register may be used (in conjunction with a link stack) to track all subroutines executed before a current subroutine. In the POWER™ instruction set architecture (ISA), some indirect branches use the count register (CTR) to provide an indirect branch target. Other indirect branches, e.g., subroutine returns (such as a branch conditional to link register (BCLR) instruction), are usually better predicted using the link stack.

In the POWER ISA, a branch conditional to count register (BCCTR) instruction has utilized the CTR to provide an indirect branch target. That is, the BCCTR instruction conditionally branches to an instruction specified by an address contained within the CTR. Branches that utilize the BCCTR instruction include switches, various calculated target tables, and other types of programmed indirection. A BCCTR instruction may be conditional or unconditional depending on a value specified in a BO field, which is a control field that determines, for example, whether the branch is based on the condition register (CR) and on what CR value to branch. For non-BCCTR instructions the BO field may be decremented and tested on the CTR (i.e., the CTR can be used for either a target address or a loop count).

BRIEF SUMMARY

A technique for operating a processor includes identifying a difficult branch instruction (branch) whose target address (target) has been mispredicted multiple times. Information about the branch (which includes a current target and a next target) is learned and stored in a data structure. In response to the branch executing subsequent to the storing, whether a branch target of the branch corresponds to the current target in the data structure is determined. In response to the branch target of the branch corresponding to the current target of the branch in the data structure, the next target of the branch that is associated with the current target of the branch in the data structure is determined. In response to detecting that a next instance of the branch has been fetched, the next target of the branch is utilized as the predicted target for execution of the next instance of the branch.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 4 is a diagram of a relevant portion of an exemplary hotness table, configured according to an embodiment of the present disclosure;

FIG. 5 is another diagram of a relevant portion of an exemplary tracking table, configured according to an embodiment of the present disclosure;

FIG. 6 is yet another diagram of a relevant portion of an exemplary pattern cache, configured according to an embodiment of the present disclosure;

DETAILED DESCRIPTION

Figure 1:
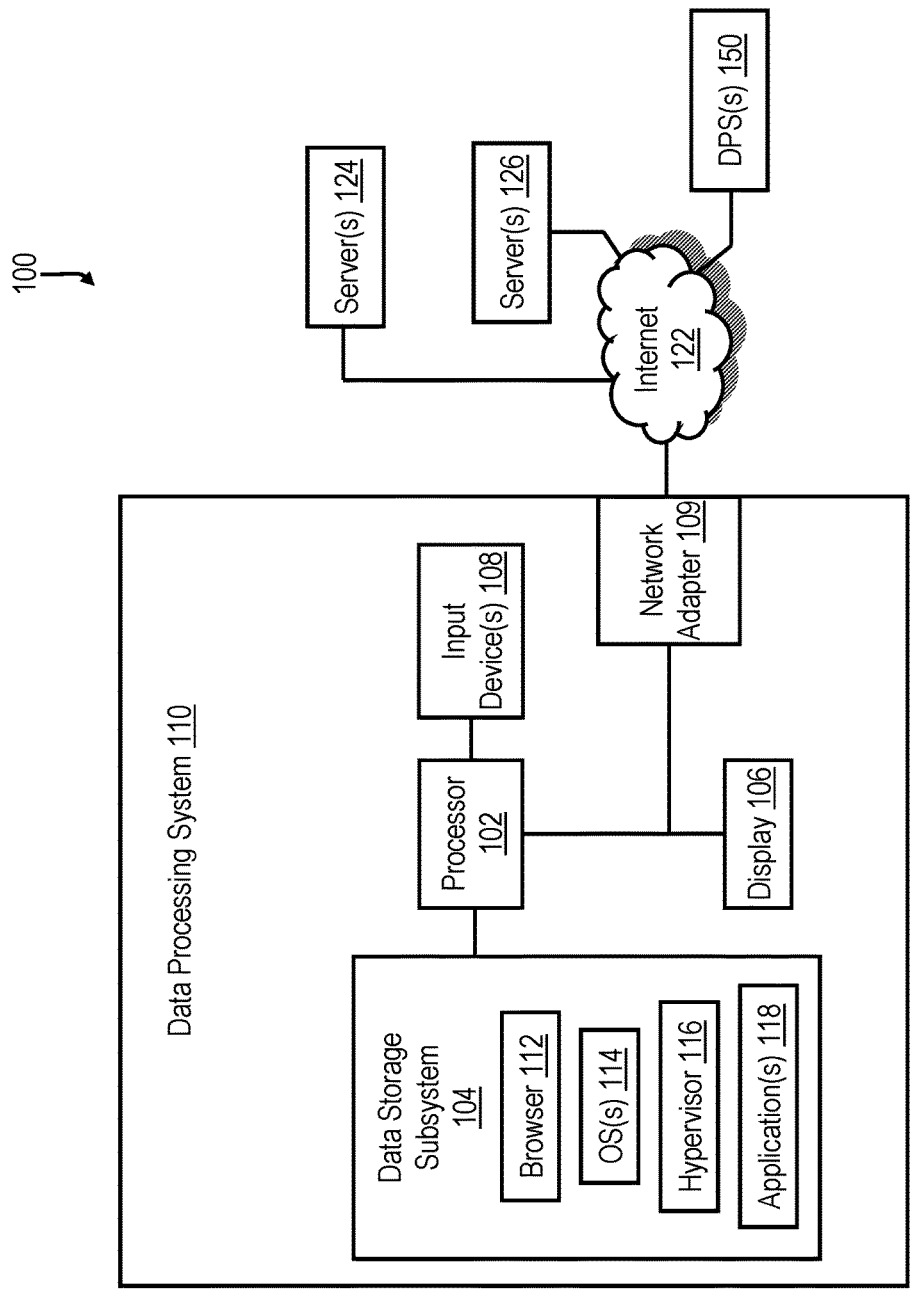
FIG. 1 is a diagram of a relevant portion of an exemplary data processing system environment that includes a simultaneous multithreading (SMT) data processing system that is configured to predict a target address of an indirect branch instruction (branch) according to the present disclosure.

The illustrative embodiments provide a method, a data processing system, and a processor configured to predict a target address of an indirect branch instruction executing in a simultaneous multithreading data processing system.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements. As used herein, the term 'executed branch instruction' may encompass a 'completed branch instruction', as a 'completed branch instruction' has both executed and completed.

Techniques of the present disclosure relate to predicting target addresses (targets) for indirect branch instructions (branches) and may be employed in conjunction with conventional mechanisms that also predict targets of indirect branches. A known target predictor used for a branch conditional to count register (BCCTR) instruction is referred to as a count cache. In at least one known processor architecture, a count cache has been implemented using a local count cache and a global count cache. The local count cache is indexed only by a branch address, while the global count cache is indexed by the branch address exclusive OR'd with a global history vector (GHV). The GHV is a register that varies based on a path that code took to get to a current branch. Local and global count caches and GHVs are further described in U.S. patent application Ser. No. 13/961,956, entitled "TECHNIQUES FOR SELECTING A PREDICTED INDIRECT BRANCH ADDRESS FROM GLOBAL AND LOCAL CACHES," the disclosure of which is hereby incorporated herein by reference in its entirety.

There are certain indirect branches prevalent in some emerging workloads whose targets are not well predicted using a count cache approach. Each of these indirect branches has a certain pattern of targets the indirect branches tend to traverse, i.e., if a target of a branch is a particular location then a next time the branch is executed a next target of the branch is usually a different particular location. In general, the local and global count cache approach (described in U.S. patent application Ser. No. 13/961,956) produces poor predicted targets for an indirect branch whose current target is only correlated with a previous target of the indirect branch and is not correlated to a path leading up to the indirect branch.

According to embodiments of the present disclosure, when a candidate branch (i.e., a branch with a difficult to predict target) is identified, information about the branch candidate is first stored in a hotness table. Additional information about the candidate branch may be later stored in a tracking table. Finally, information about a candidate branch tracked in the tracking table may be later stored in a pattern cache. When a difficult to predict branch is fetched and a next target is available in the pattern cache (from previous times the branch executed (or alternatively completed)) then the next target saved in the pattern cache is used for target prediction (instead of a target predicted by a count cache).

According to one or more embodiments of the present disclosure, a pattern cache entry may be utilized in predicting a target for a branch conditional to count register (BCCTR) instruction when doing so with a count cache approach has been repeatedly unsuccessful. According to the present disclosure, problematic branches (i.e., branches with difficult to predict targets) are identified for inclusion in a pattern cache. In general, the idea is to identify BCCTR instructions that experience a relatively high number of target mispredictions. Information about problematic branches is learned and the pattern cache is populated with the information about the problematic branches to facilitate lookup of a next target for the problematic branch using a current target for the branch. When a problematic branch is predicted 'taken', a determination is made by the branch target predictor as to whether there is a hit in the pattern cache for the branch. If a hit occurs in the pattern cache, a target of a next instance of the problematic branch is read from the pattern cache and saved for the next time the problematic branch is executed. Upon detection that the problematic branch is being fetched and a next target for the problematic branch was saved, the branch target predictor is configured to use the next target (saved in the pattern cache), instead of a target provided using the count cache.

In at least one embodiment, a branch target predictor data structure includes a hotness table, a tracking table, and a pattern cache. In one or more embodiments, the hotness table contains eight entries that may be allocated to problematic branches (e.g., BCCTR instructions) for which targets have been repeatedly mispredicted. In at least one embodiment, four of the eight hotness table entries are tracked at any given time in a four entry tracking table. The tracking table tracks BCCTR instructions that have target mispredictions for possible inclusion in the pattern cache. The goal is to identify BCCTR instructions that experience target mispredictions at higher levels for entry into the pattern cache. In one or more embodiments, if the count cache is able to accurately predict a target for a branch that has been written to an entry in the pattern cache, then the entry in the pattern cache for the branch is (eventually) replaced by another branch whose target is not as easily predicted.

In at least one embodiment, each thread is assigned the same number of entries in the hotness table. As one example, in single thread SMT1 mode, all eight hotness table entries are available to thread zero (T0). In SMT2 mode, four entries are available to thread T0 and the other four entries are available to thread two (T2). In SMT4 mode, each of four threads has two hotness table entries available. In one or more embodiments, each entry in the hotness table includes: a two bit thread identifier (ID); a branch address (e.g., bits 39 to 58); and a four bit mispredict count. The mispredict count is used to track which branches are candidates for inclusion in the tracking table. In one embodiment, when a branch is first installed in the hotness table it is assigned an initial mispredict count of two. In one or more embodiments, the mispredict count is incremented when a hotness table entry has a hit and either the pattern cache was not used and a target for the branch was mispredicted (e.g., the count cache was used and mispredicted) or if the pattern cache was used then the pattern cache prediction was correct and if the count cache had been used the count cache prediction would have been incorrect.

In at least one embodiment, the mispredict count for an entry is decremented when the pattern cache is not used for a branch and the count cache correctly predicts the target for the branch or if the pattern cache is used the pattern cache provided an incorrect target and the count cache would have provided a correct target. The mispredict count for all entries associated with a thread are decremented when a branch target for the thread is mispredicted and there are no hotness table entries for the thread with a zero mispredict count. In one or more embodiments, the mispredict count is not decremented below zero or incremented above fifteen. If a mispredict count for an entry in the hotness table is zero then the entry is available to the next branch in an associated thread that has a mispredicted target. In one embodiment, if the mispredict count for an entry in the hotness table is greater than or equal to nine the entry is eligible to be entered into one of four tracking table entries. If the mispredict count of a branch that is in an entry in the tracking table falls below five then the entry can be replaced by another branch in the hotness table that has a count of at least nine that is not already in the tracking table. It should be appreciated that the threshold levels in which action is taken may be different from those set forth above.

Once a branch that is in the hotness table reaches a threshold to be installed in the tracking table then additional information about the branch (discussed in further detail below) is saved that facilitates both updating the pattern cache and also accessing the pattern cache to generate a predicted target for a next instance of the branch. In at least one embodiment, each entry in the tracking table includes: a four bit hotness value that is initially (and when periodically updated) the same as the hotness table mispredict count; a branch address (e.g., bits 39 to 61) that corresponds to the hotness table branch address with three additional bits, which may be desirable for accessibility and timing; a pending indicator that indicates (at fetch) that a new lookup in the pattern cache is required to provide a next target for the branch (even though the pattern cache has not yet been read); a last completion target effective address, last_comp_target ea (e.g., bits 32 to 61), which is a target used from previous execution (or alternatively completion) of the branch and is used to select an entry in the pattern cache for update; a last predicted target effective address, last_pred_target ea (e.g., bits 32 to 61), which is the last target encountered for a branch, is set at prediction, and also set if the branch flushes (more particularly, the last_pred_target is used when a branch is predicted but not completed and if the branch flushes at execution (or alternatively completion) then the last_comp_target is available for a next lookup in the pattern cache, i.e., the last_pred_target is used when a branch is predicted and the last_comp_target is used next when the branch mispredicts using the last_pred_target); and a next target effective address, next target ea (e.g., bits 32 to 61), which may have an associated parity indication. The next target is a predicted target for the branch that is to be used the next time the branch is encountered. The mispredict count may be provided directly from the hotness table to the hotness value of the tracking table. In one or more embodiments, each cycle a hotness value is updated for one of the tracking table entries. In this manner, each entry in the tracking table receives an updated hotness value every four cycles.

In at least one embodiment, a pattern cache includes two-hundred fifty-six (256) entries. In one or more embodiments, each entry in the pattern cache includes: a ten bit tag (prev_tag(bits 0:9)) that is created by folding a previous global history vector (GHV) with a previous target (a pattern cache entry is selected when a tag associated with a branch in an entry of the tracking table matches a tag of the pattern cache entry); a next target (tgt_addr(32:61)) for the branch that is most likely to follow the previous target and the previous GHV; a parity (tgt_addr_p) for the next target; an alternate target hash (second_tgt_hash(0:3)) for a second most common next target for the branch with four bits folded down from an alternate next target, i.e., alternate target(32:61) provided by a count cache; a count (tgt_hit_count(0:2)) associated with the next target (tgt_addr); an alternate target count (second_tgt_hit_count(0:2)) associated with an alternate next target hash (second_tgt_hash(0:3)); and a count (better_then_cc_cnt(0:3)) to track if a next target predicted by the pattern cache is better or worse than a next target predicted by the count cache (if the next target predicted by the pattern cache is worse, the next target predicted by the pattern cache is not used).

In various embodiments, the pattern cache is updated when a branch that is being tracked in the tracking table executes (or alternatively completes, assuming a time delay is not too large). When a branch executes (or alternatively completes), an address for the executing (or alternatively completing) branch is compared against the branch addresses in the four tracking table entries. The pattern cache is updated if the branch address of the executing (or alternatively completing) branch matches the branch address of one of the four entries in the tracking table and the hotness value for the matching tracking table entry is greater than or equal to a threshold (e.g., nine) for pattern cache updates. If the address of the executing (or alternatively completing) branch is in the tracking table and the hotness value is greater than or equal to the threshold for a pattern cache update then the pattern cache is accessed using a tag created from the previous completion target (last_comp_target) for the tracking table entry. If a tag (prev_tag) of an entry in the pattern cache matches the tag created using the previous completion target (last_comp_target) then a hit for the branch is indicated and the entry is updated. If a hit does not occur in the pattern cache, an existing entry in the pattern cache may be replaced or an empty entry may be filled.

In one or more embodiments, a predicted target is stored in an effective address table (EAT). When a count cache is used to predict a next target for a branch there is a four bit field to the EAT that is used to track the count cache that is not selected (i.e., the local count cache or the global count cache) so that a selector for the count cache can be updated. While it would be desirable to have a count cache target at branch execution (or alternatively completion), when the pattern cache is used to predict a next target for a branch the count cache target is not available in one or more embodiments. As such, when the pattern cache is selected the four bit field to the EAT is instead used to save a hash of the count cache predicted target (i.e., a compressed version of the alternate next target predicted by the count cache). When the pattern cache is selected, update logic assumes that the alternate next target would have been wrong.

If the next target (tgt_addr) provided by the pattern cache is correct then the target hit count (tg_hit_count) is incremented. If the alternate target hash (second_tgt_hash) matches the hash generated from the alternate next target predicted by the count cache then the alternate target hit count (second_tgt_hit_count) is incremented. If the alternate target hit count (second_tgt_hit_count) becomes greater then the target hit count (tgt_hit_count) then the target (tgt_addr) is swapped with the alternate target. If the actual target does not match either of the targets then both of the hit counts are decremented.

When a branch executes (or alternatively completes) a determination can be made as to whether the target predicted by the count cache was better, worse, or the same as the target predicted by the pattern cache. If the pattern cache is better than the cache count, the better than cache count counter (better_than_cc_cnt) is incremented. If the count cache is better than the pattern cache, the better than cache count counter (better_than_cc_cnt) is decremented. In one or more embodiments, the better than cache count counter (better_than_cc_cnt) is not allowed to wrap, so the counter does not increment beyond a maximum or decrement below zero. If the count cache and the pattern cache both give the same result (correct or incorrect) then the better than cache count counter (better_than_cc_cnt) is left unchanged. In one or more embodiments, when an entry is created in the pattern cache a value of the better than count cache counter (better_than_cc_cnt) is set to eight, i.e., 'b1000'. The most significant bit may be used to determine which pattern cache entry should be used. Some BCCTRs that are hard to predict are better predicted using the count cache. In fact, some next targets may not be very well correlated with previous targets and in this case the count cache may supply superior target prediction. Tracking whether the pattern cache is superior to the count cache (using the better_than_cc_cnt) provides information from which a superior predictor may be selected. An issue is that when the count cache is used for target prediction the pattern cache is not accessed. If the count cache is used for target prediction then the pattern cache address is not available. As such, if the count cache wrongly predicts a next target for a branch then an assumption is made that the pattern cache would have provided a correct next target for the branch.

In one or more embodiments, due to timing considerations a next target cannot be read from the pattern cache at target prediction. As such, the tracking table is read when a problematic branch is predicted or when a problematic branch is flushed and an associated next target is saved in the tracking table. The next target is then used as the predicted target the next time a fetch matches a branch address in the tracking table. The pattern cache is read if one of the branches in the tracking table executes (or alternatively completes) or if a tracking table entry is associated with a pattern cache prediction. It is not anticipated that both would often occur at the same time, but if both do occur at the same time then the read from the prediction is delayed. When a pattern cache entry is updated because an executing (or alternatively completing) branch hits in the tracking table and at the same time a pattern cache target prediction requires a pattern cache read, the read of the pattern cache for the target prediction is delayed (queued up).

Potentially, all four entries in the tracking table could be queued up if executing (or alternatively completing) indirect branches hit in the tracking table for a number of cycles. If the count cache is used to predict a next target for a branch then the pattern cache is not available to predict a next target for the branch. If a next target for a branch that is provided by the count cache is wrong, then an assumption is made that the pattern cache would have predicted a correct next target when the branch executes (or alternatively completes). As noted above, the pattern cache is read for update purposes at branch execution (or alternatively completion) using a previous target/GHV for the branch. It should be appreciated that if a branch flushes there may be additional delay between the time the branch executes and completes. In this case, it may be desirable to read the pattern cache when a branch flushes, but a basic assumption of the pattern cache is that two occurrences of the branch are spread out for the pattern cache prediction to provide satisfactory results.

With reference to FIG. 1, an exemplary data processing environment 100 is illustrated that includes a simultaneous multithreading (SMT) data processing system 110 that is configured to predict a target of an indirect branch whose target is correlated with (but not equal to) a target of a previous instance of the branch instruction. Data processing system 110 may take various forms, such as workstations, laptop computer systems, notebook computer systems, desktop computer systems or servers and/or clusters thereof. Data processing system 110 includes one or more processors 102 (which may include one or more processor cores for executing program code) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes one or more operating systems (OSs) 114 for data processing system 110. Data storage subsystem 104 also includes application programs, such as a browser 112 (which may optionally include customized plug-ins to support various client applications), a hypervisor (or virtual machine monitor (VMM)) 116 for managing one or more virtual machines (VMs) as instantiated by different OS images, and other applications (e.g., a word processing application, a presentation application, and an email application) 118.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
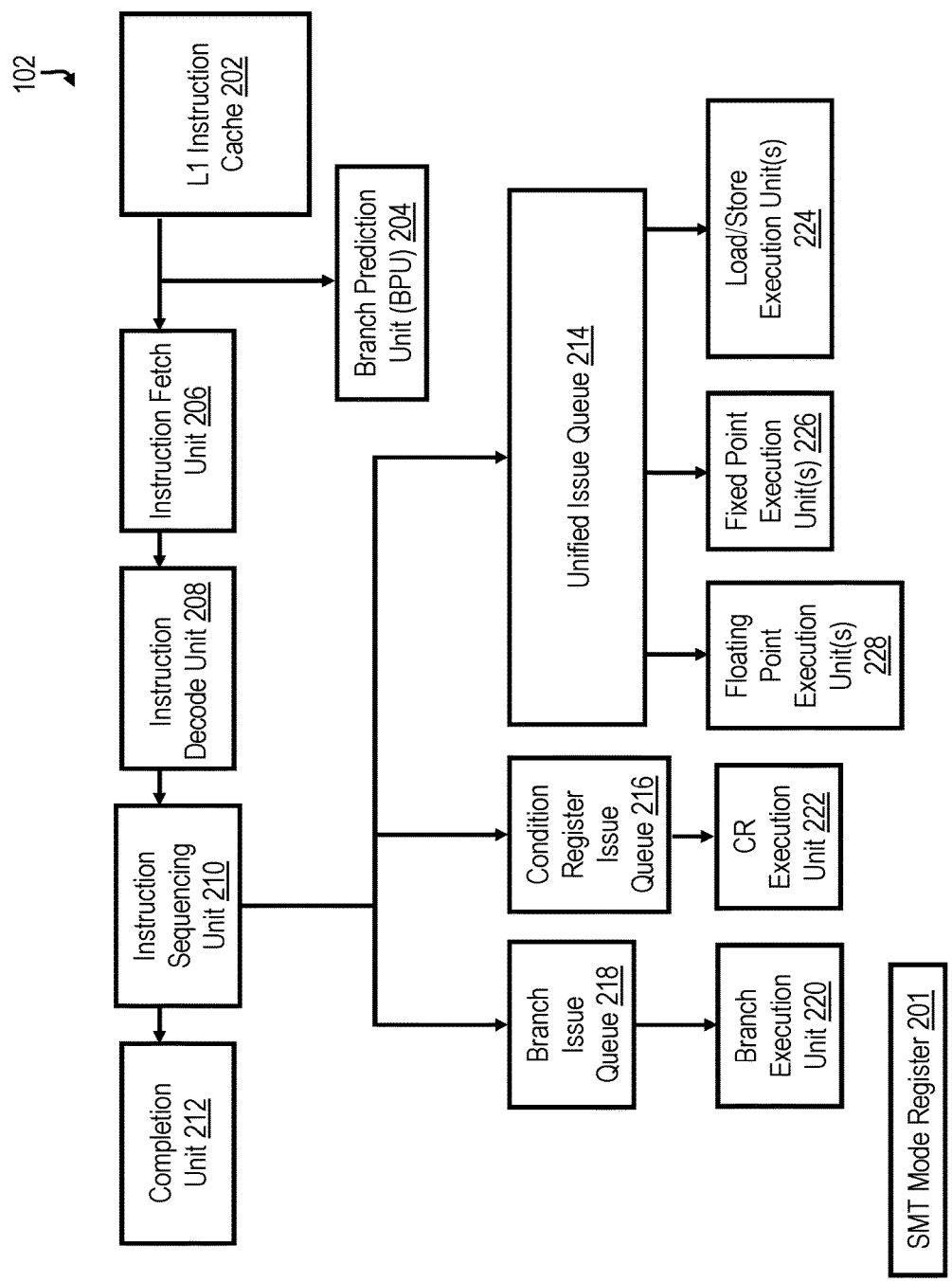
FIG. 2 is a diagram of a relevant portion of an exemplary processor pipeline of the data processing system of FIG. 1.

With reference to FIG. 2, relevant components of processor 102 are illustrated in additional detail. Processor 102 includes a level one (L1) instruction cache 202 from which instruction fetch unit (IFU) 206 fetches instructions. In one or more embodiments, IFU 206 may support a multi-cycle (e.g., three-cycle) branch scan loop to facilitate scanning a fetched instruction group for branch instructions predicted 'taken', computing targets of the predicted 'taken' branches, and determining if a branch instruction is an unconditional branch or a 'taken' branch. Fetched instructions are also provided to branch prediction unit (BPU) 204, which predicts whether a branch is 'taken' or 'not taken' and a target of predicted 'taken' branches.

In one or more embodiments, BPU 204 includes a branch direction predictor that implements a local branch history table (LBHT) array, global branch history table (GBHT) array, and a global selection (GSEL) array. The LBHT, GBHT, and GSEL arrays (not shown) provide branch direction predictions for all instructions in a fetch group (that may include up to eight instructions). The LBHT, GBHT, and GSEL arrays are shared by all threads. The LBHT array may be directly indexed by bits (e.g., ten bits) from an instruction fetch address provided by an instruction fetch address register (IFAR). The GBHT and GSEL arrays may be indexed by the instruction fetch address hashed with a global history vector (GHV) (e.g., a 21-bit GHV reduced down to eleven bits, which provides one bit per allowed thread). The value in the GSEL array may be employed to select between the LBHT and GBHT arrays for the direction of the prediction of each individual branch. As is discussed in further detail below, in various embodiments, BPU 204 is also configured to predict a target of an indirect branch whose target is correlated with a target of a previous instance of the branch utilizing a pattern cache.

IFU 206 provides fetched instructions to instruction decode unit (IDU) 208 for decoding. IDU 208 provides decoded instructions to instruction sequencing unit (ISU) 210 for dispatch. In one or more embodiments, ISU 210 is configured to dispatch instructions to various issue queues, rename registers in support of out-of-order execution, issue instructions from the various issues queues to the execution pipelines, complete executing instructions, and handle exception conditions. In various embodiments, ISU 210 is configured to dispatch instructions on a group basis. In a single thread (ST) mode, ISU 210 may dispatch a group of up to eight instructions per cycle. In simultaneous multi-thread (SMT) mode, ISU 210 may dispatch two groups per cycle from two different threads and each group can have up to four instructions. It should be appreciated that in various embodiments, all resources (e.g., renaming registers and various queue entries) must be available for the instructions in a group before the group can be dispatched. In one or more embodiments, an instruction group to be dispatched can have at most two branch and six non-branch instructions from the same thread in ST mode. In one or more embodiments, if there is a second branch the second branch is the last instruction in the group. In SMT mode, each dispatch group can have at most one branch and three non-branch instructions.

In one or more embodiments, ISU 210 employs an instruction completion table (ICT) that tracks information for each of two-hundred fifty-six (256) input/output operations (IOPs). In one or more embodiments, flush generation for the core is handled by ISU 210. For example, speculative instructions may be flushed from an instruction pipeline due to branch misprediction, load/store out-of-order execution hazard detection, execution of a context synchronizing instruction, and exception conditions. ISU 210 assigns instruction tags (ITAGs) to manage the flow of instructions. In one or more embodiments, each ITAG has an associated valid bit that is cleared when an associated instruction completes. Instructions are issued speculatively, and hazards can occur, for example, when a fixed-point operation dependent on a load operation is issued before it is known that the load operation misses a data cache. On a mis-speculation, the instruction is rejected and re-issued a few cycles later.

Following execution of dispatched instructions, ISU 210 provides the results of the executed dispatched instructions to completion unit 212. Depending on the type of instruction, a dispatched instruction is provided to branch issue queue 218, condition register (CR) issue queue 216, or unified issue queue 214 for execution in an appropriate execution unit. Branch issue queue 218 stores dispatched branch instructions for branch execution unit 220. CR issue queue 216 stores dispatched CR instructions for CR execution unit 222. Unified issued queue 214 stores instructions for floating point execution unit(s) 228, fixed point execution unit(s) 226, load/store execution unit(s) 224, among other execution units. Processor 102 also includes an SMT mode register 201 whose bits may be modified by hardware or software (e.g., an operating system (OS)). It should be appreciated that units that are not necessary for an understanding of the present disclosure have been omitted for brevity and that described functionality may be located in a different unit.

Figure 3:
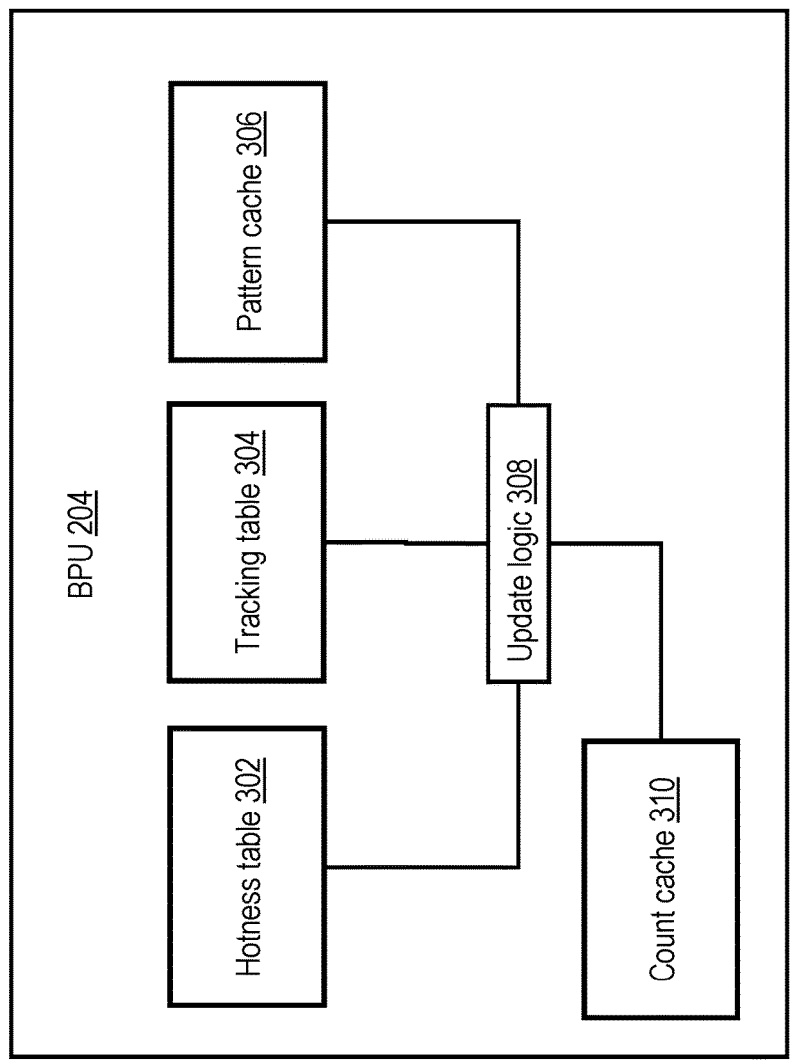
FIG. 3 is a diagram of a relevant portion of an exemplary branch prediction unit (BPU) that is configured to predict a target address (target) of an indirect branch according to the present disclosure.

With reference to FIG. 3, BPU 204 is illustrated as including a hotness table 302, a tracking table 304, a pattern cache 306, and update logic 308 that initially writes and updates entries in hotness table 302, tracking table 304, and pattern cache 306. Update logic 308 is also coupled to count cache 310. Count cache 310 provides an alternate target for a branch, among other information for the branch, to update logic 308. With reference to FIG. 4, hotness table 302 is illustrated as including eight entries, two for each of four threads, for a processor that is running in SMT4 mode. As is illustrated, a first entry in hotness table 302 includes a thread identifier (ID) '0', a branch address 'A', and a mispredict count '0'. A second entry in hotness table 302 includes a thread identifier (ID) '0', a branch address 'B', and a mispredict count '9'. A third entry in hotness table 302 includes a thread identifier (ID) '1', a branch address 'C', and a mispredict count '2'. A fourth entry in hotness table 302 includes a thread identifier (ID) '1', a branch address 'D', and a mispredict count '6'. A fifth entry in hotness table 302 includes a thread identifier (ID) '2', a branch address 'E', and a mispredict count '10'. A sixth entry in hotness table 302 includes a thread identifier (ID) '2', a branch address 'F', and a mispredict count '5'. A seventh entry in hotness table 302 includes a thread identifier (ID) '3', a branch address 'G, and a mispredict count '12'. An eighth entry in hotness table 302 includes a thread identifier (ID) '3', a branch address 'G, and a mispredict count '15'.

As noted above, in one embodiment, an entry in hotness table 302 may be replaced when the entry has a mispredict count of zero. As previously mentioned, upon initial entry into hotness table 302 all entries are marked as having a mispredict count of two so that entries are not immediately available to be replaced by a next branch that has a mispredicted target and is not already in hotness table 302. In one or more embodiments, when the mispredict count for an entry in hotness table 302 is greater than or equal to nine, the entry is eligible to be written to an entry in tracking table 304 whose associated hotness value falls below five. In at least one embodiment, the mispredict count for an entry in hotness table 302 is incremented when a hotness table entry has a hit and either pattern cache 306 was not used and a predicted target for the branch was incorrect (i.e., a target predicted by count cache 310 was used and incorrect) or if pattern cache 306 was used then a target predicted by pattern cache 306 was correct and if count cache 310 had been used a target predicted by count cache 310 would have been incorrect. In at least one embodiment, the mispredict count for an entry in hotness table 302 is decremented when pattern cache 306 is not used to predict a target for a branch and count cache 310 correctly predicts the target for the branch or if pattern cache 306 was used pattern cache 306 provided an incorrect target and count cache 310 if used would have predicted a correct target. A mispredict count for all entries associated with a thread in hotness table 302 are decremented when a branch target for the thread is mispredicted and there are no entries in hotness table 302 for the thread with a mispredict count of zero. Based on the conditions set forth above, the second, fifth, seventh, and eighth entries in hotness table 302 are available to be written to tracking table 304 and the first entry in hotness table 302 is available to be replaced on a next branch mispredict for thread '0'.

When a branch that is in hotness table 302 reaches a threshold to be installed into tracking table 304 then additional information about the branch is saved to facilitate both updating pattern cache 306 and also accessing pattern cache 306 to generate a predicted target for a next instance of the branch. As previously mentioned, in at least one embodiment, tracking table 304 include four entries. With reference to FIG. 5, tracking table 304 is illustrated as including four populated entries. For brevity, only fields in FIG. 5 that have information that is relevant to the current discussion are illustrated as being populated. A first entry in tracking table 304 has a hotness value '9', an address 'B+', a last completed target 'AA', and a next target 'EE'. A second entry in tracking table 304 has a hotness value '10', an address 'E+', a last completed target 'BB', and a next target 'FF'. A third entry in tracking table 304 has a hotness value '12', an address 'G+', a last completed target 'CC', and a next target 'GG'. A fourth entry in tracking table 304 has a hotness value '15', an address H+', a last completed target 'DD', and a next target 'HH'. The '+' associated with an address means that the address corresponds to the address without a '+' in hotness table 302 with one or more additional address bits. For example, the address 'B+' corresponds to the address 'B' with additional address bits.

In various embodiments, pattern cache 306 is updated when a branch that is being tracked in tracking table 304 executes (or alternatively completes). When a branch executes (or alternatively completes), an address for the branch (more specifically, selected address bits of the branch) is compared against the branch addresses of the four entries in tracking table 304. Pattern cache 306 is updated if the branch address of the executing (or alternatively completing) branch matches the branch address of one of the four entries in tracking table 304 and the hotness value for the matching entry in tracking table 304 is greater than or equal to a threshold (e.g., nine) for updating pattern cache 306. If the address of the executing (or alternatively completing) branch is in tracking table 304 and the hotness value is greater than or equal to the threshold for an update to pattern cache 306 then pattern cache 306 is read using the previous completed target (last_comp_target) from tracking table 304. If a tag (prev_tag) of an entry in pattern cache 306 matches a tag created using the previous completion target (last_comp_target) then a hit for the branch is indicated and the entry in pattern cache 306 is updated. If a tag hit does not occur in pattern cache 306, an existing entry in pattern cache

306 may be replaced (assuming no empty entries are available) or an empty entry in pattern cache 306 may be selected for a new entry.

With reference again to FIG. 5, assuming a branch associated with the first entry in tracking table 304 executes (or alternatively completes) and a threshold for updating pattern cache 306 is '10' then pattern cache 306 is not updated as the first entry has a hotness value of '9'. However, assuming a branch associated with the second entry in tracking table 304 executes (or alternatively completes) and a threshold for updating pattern cache 306 is '10' then pattern cache 306 is updated as the second entry has a hotness value of '10'.

With reference to FIG. 6, a new entry in pattern cache 306 is allocated and updated with the information associated with a branch at address 'E+' in tracking table 304, where <BB> indicates a tag of a previous target 'BB' for a branch at address 'E+' and having a next target 'FF'. For brevity, only fields in FIG. 6 that have information that are relevant to the current discussion are illustrated as being populated. As previously mentioned, the new entry in pattern cache 306 is created by update logic 308 upon execution (or alternatively completion) of a branch having an address 'E+', given that the branch is one of four entries in tracking table 304 and that the branch has a hotness value '10' which is greater than or equal to a threshold '10'. It should be appreciated that pattern cache 306 would be further updated with information associated with the third and fourth entries from tracking table 304 upon execution (or alternatively completion) of associated branches assuming that associated hotness values remained greater than or equal to the threshold. Although not shown, it should also be appreciated that any given branch may have multiple entries (i.e., one for each tag-target pair) in pattern cache 306. It should also be appreciated that a tag for addressing pattern cache 306 may include any number of bits providing that different entries in pattern cache 306 are distinguishable.

Figure 7:
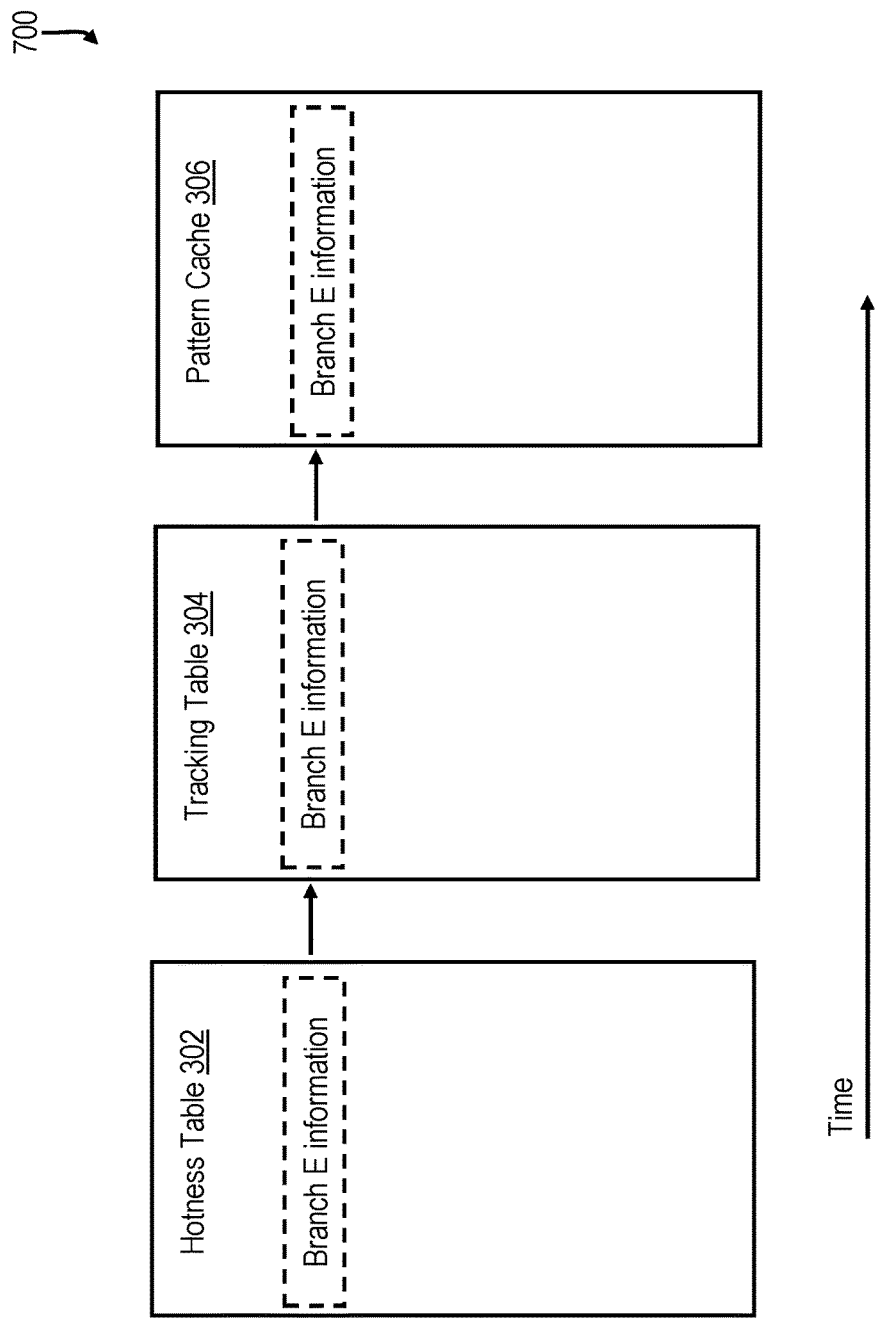
FIG. 7 is a diagram illustrating sequential updating of a hotness table, tracking table, and pattern cache, according to an embodiment of the present disclosure.

With reference to FIG. 7, a diagram 700 illustrates how entries in hotness table 302, tracking table 304, and pattern cache 306 are sequentially populated with information associated with branch 'E' over time. In various embodiments, an entry in hotness table 302 is initially populated with information on branch 'E' when a target for the branch is mispredicted. When a mispredict count on branch 'E' is greater than or equal to a first threshold, an entry in tracking table 304 is populated with information on branch 'E'. When branch 'E' executes (or alternatively completes) and a hotness value on branch 'E' is greater than or equal to a second threshold, an entry in pattern cache 306 is populated with information on branch 'E'. It should be appreciated that if a count cache eventually provides a correct target for branch 'E' that an entry for branch 'E' will eventually be replaced by another branch in hotness table 302, tracking table 304, and pattern cache 306.

Figure 8:
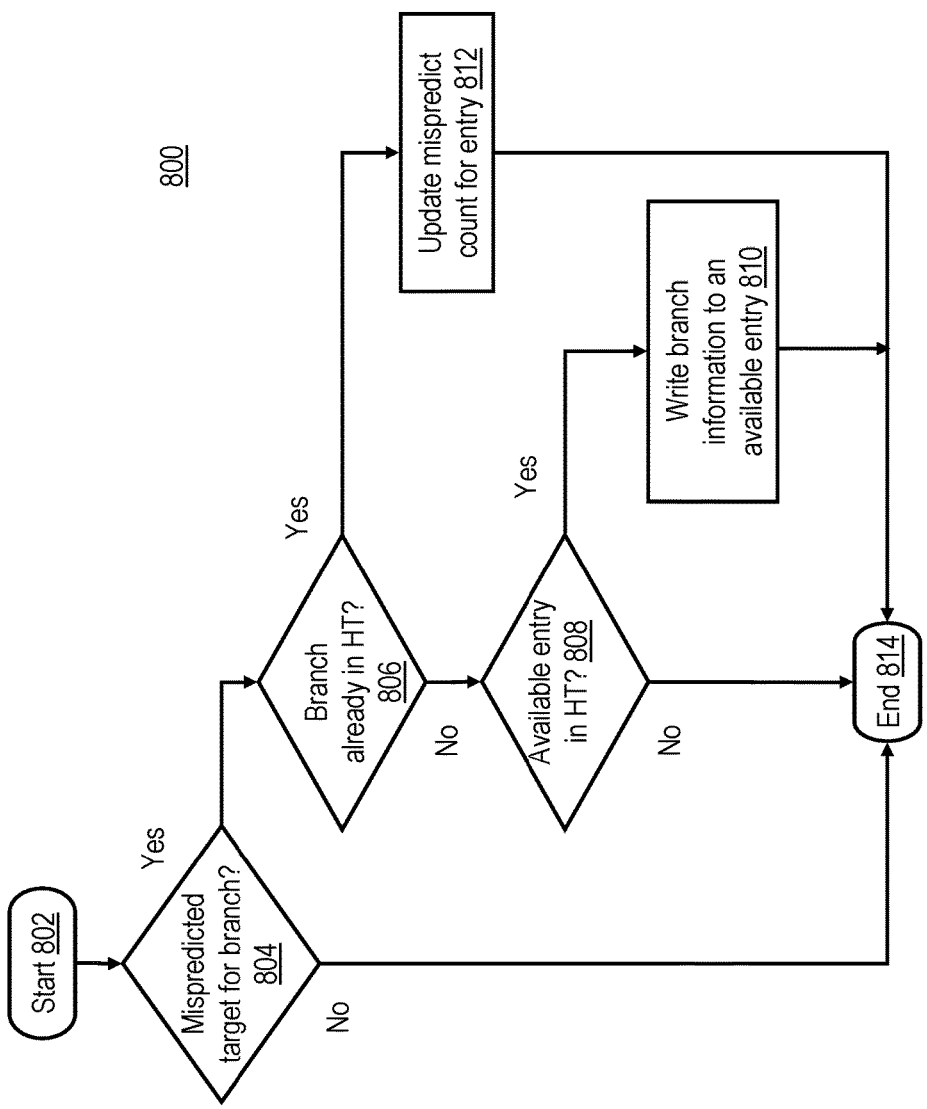
FIG. 8 is a flowchart of an exemplary process implemented by update logic associated with a hotness table, configured according to one embodiment of the present disclosure.

With reference to FIG. 8, an exemplary process 800 for updating hotness table 302, according to an embodiment of the present disclosure, is illustrated. Process 800 is initiated in block 802 by, for example, update logic 308 in response to, for example, execution (or alternatively completion) of an indirect branch. Next, in decision block 804, update logic 308 determines whether the executed (or alternatively completed) branch had a mispredicted target. In response to the branch not having a mispredicted target in block 804 control transfers to block 814, where process 800 terminates. In response to the branch having a mispredicted target in block 804 control transfers to decision block 806, where update logic 308 determines whether the branch is already present in an entry in hotness table (HT) 302.

In response to the branch already being present in an entry in hotness table 302 in block 806 control transfers to block 812, where update logic 308 updates a mispredict count for the entry in hotness table 302. As one example, assuming the branch that executed (or alternatively completed) belongs to thread '3' and has branch address 'G', the mispredict count for the seventh entry in hotness table 302 of FIG. 3 is incremented from '12' to '13'. As another example, assuming the branch that executed (or alternatively completed) belongs to thread '3' and has branch address 'H', the mispredict count for the eighth entry in hotness table 302 of FIG. 3 is not incremented as the mispredict count is already at a saturation value of '15'. From block 812 control transfers to block 814.

In response to the branch not already being present in an entry in hotness table 302 in block 806 control transfers to decision block 808, where update logic 308 determines whether an entry in hotness table 302 is available. A new entry for a given thread may be allocated in hotness table 302 in the event that all entries assigned to the given thread have not already been allocated or an existing entry for the given thread in hotness table 302 may be replaced when the existing entry has a mispredict count of zero. For example, assuming the branch that executed (or alternatively completed) belongs to thread 'T0', information for the branch that executed (or alternatively completed) may replace the first entry for thread 'T0' in hotness table 302 of FIG. 3, as the mispredict count for the first entry is zero. In response to an entry not being available in hotness table 302 in block 808 control transfers to block 814. In response to an entry being available in hotness table 302 in block 808 control transfers to block 810, where update logic 308 writes information for the branch to an available entry in hotness table 302. As one example, assuming the branch that executed (or alternatively completed) belongs to thread '1' and has branch address 'C', update logic 308 writes a thread ID '1' and branch address 'C' for the branch to a third entry in hotness table 302 of FIG. 3, while initially setting a mispredict count to '2'. From block 810 control transfers to block 814.

Figure 9:
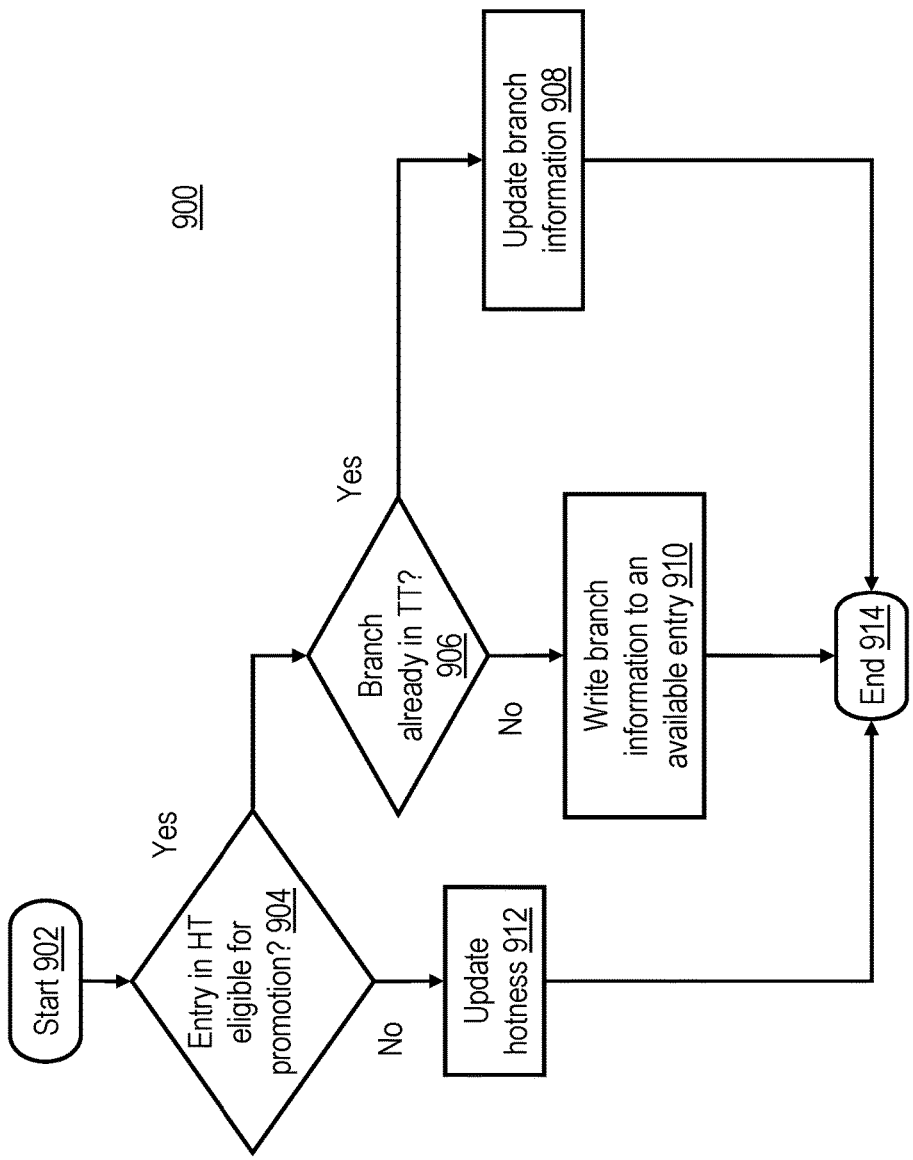
FIG. 9 is a flowchart of an exemplary process implemented by update logic associated with a tracking table, configured according to one embodiment of the present disclosure.

With reference to FIG. 9, an exemplary process 900 for updating a tracking table 304, according to an embodiment of the present disclosure, is illustrated. Process 900 is initiated in block 902 by, for example, update logic 308 in response to, for example, execution (or alternatively completion) of an indirect branch. Next, in decision block 904, update logic 308 determines whether an entry in hotness table (HT) 302 is eligible for promotion to tracking table (TT) 304. As one example, an entry in hotness table 302 may be eligible for promotion to tracking table 304 when a hotness count for the entry is greater than or equal to nine and an entry is available in tracking table 304. As one example, an entry is available in tracking table 304 when the entry is empty or the entry has a hotness value less than five.

In response to an entry in hotness table 302 not being eligible for promotion to tracking table 304 in block 904 control transfers to block 912, where update logic 308 updates a hotness value for an entry in tracking table 304. As one example, for a four entry tracking table 304 a hotness value for each entry in tracking table 304 may be updated every four cycles. From block 912 control transfers to block 914, where process 900 terminates. In response to an entry in hotness table 302 being eligible for promotion to tracking table 304 in block 904 control transfers to decision block 906, where update logic 308 determines whether an entry for a branch in hotness table 302 is already located in tracking table 304. In response to an entry in hotness table 302 not already being located in tracking table 304, control transfers to block 910, where update logic 308 writes information for the branch to an available entry. From block 910 control transfers to block 914. In response to an entry in hotness table 302 already being located in tracking table 304, control transfers to block 908, where update logic 308 updates the information for the branch. From block 908 control transfers to block 914.

Figure 10:
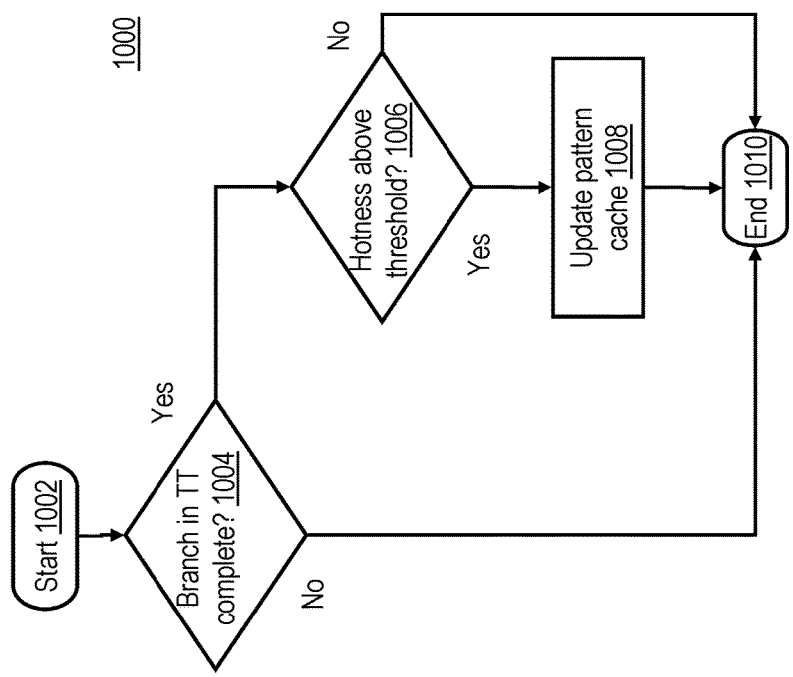
FIG. 10 is a flowchart of an exemplary process implemented by update logic associated with a pattern cache, configured according to one embodiment of the present disclosure.

With reference to FIG. 10, an exemplary process 1000 for updating a pattern cache 306, according to an embodiment of the present disclosure, is illustrated. Process 1000 is initiated in block 1002 by, for example, update logic 308 in response to execution (or alternatively completion) of an indirect branch. Next, in decision block 1004, update logic 308 determines whether the branch that executed (or alternatively completed) has an entry in tracking table (TT) 304 (i.e., whether tracking table 304 is currently tracking the branch). In response to determining that the executed (or alternatively completed) branch is not currently being tracked by an entry in tracking table 304 in block 1004 control transfers to block 1010, where process 1000 terminates. In response to update logic 308 determining that the executed (or alternatively completed) branch is currently being tracked by an entry in tracking table 304 in block 1004 control transfers to decision block 1006. In block 1006 update logic 308 determines whether a hotness value for the tracked branch is greater than or equal to a threshold. In response to update logic 308 determining that the hotness value for the tracked branch is not greater than or equal to the threshold in block 1006 control transfers to block 1010. In response to update logic 308 determining that the hotness value for the tracked branch is greater than or equal to the threshold in block 1006 control transfers to block 1008. In block 1008, update logic 308 updates an entry associate with the tracked branch in pattern cache 306. From block 1008 control transfers to block 1010.

Accordingly, techniques have been disclosed herein that advantageously improve prediction of a target address of an indirect branch instruction whose target address is correlated with a target address of a previous instance of the branch instruction.

In the flow charts above, the methods depicted in the figures may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of predicting branch target addresses in a processor including at least a tracking data structure, a pattern data structure, and a count cache, the method comprising:

tracking, in the tracking data structure, information regarding multiple difficult branch instructions whose target addresses have been mispredicted by the count cache, wherein the information includes, for each of the difficult branch instructions, a respective current predicted target address and a respective next predicted target address to be utilized for predicting a future branch execution;

maintaining, in association with each difficult branch instruction tracked in the tracking data structure, a respective hotness value representing a number of target mispredictions for the associated difficult branch instruction by the count cache;

based on determining an actual branch target address of a particular difficult branch instruction tracked in the tracking data structure corresponds to the current predicted target address of the particular difficult branch instruction and the hotness value of the particular difficult branch instruction satisfies a prediction threshold, populating the pattern data structure with a new entry corresponding to the particular difficult branch instruction from the tracking data structure, the entry including at least the next predicted target address;

decrementing the hotness value of the particular difficult branch instruction and removing the entry from the pattern data structure based on a number of target mispredictions for the particular difficult branch instruction by the pattern data structure; and predicting a branch target address of a next execution of the particular difficult branch instruction from the pattern data structure based on the entry not being removed from the pattern data structure and otherwise predicting the branch target address by reference to the count cache.

2. The method of claim 1, wherein the particular difficult branch instruction corresponds to a branch conditional count register instruction.

3. The method of claim 1, and further comprising:
initially recording an entry for the particular difficult branch instruction in a hotness data structure and thereafter promoting the particular difficult branch instruction to the tracking data structure.

4. The method of claim 3, wherein:
the entry in the hotness data structure includes a thread identifier for the particular difficult branch instruction, at least a portion of an instruction address for the difficult branch instruction, and a mispredict count indicating whether the entry in the hotness data structure is eligible for promotion to the tracking data structure; and
the promoting includes promoting the entry for the particular difficult branch instruction from the hotness data structure to the tracking data structure based on the mispredict count for the particular difficult branch instruction.

5. A processor, comprising:
an instruction cache;
an execution unit that executes branch instructions to calculate target addresses; and
a branch prediction unit coupled to the instruction cache, wherein the branch prediction unit includes:
a count cache;
a tracking data structure including entries that record information regarding multiple difficult branch instructions whose target addresses have been mispredicted by the count cache, wherein the information includes, for each of the difficult branch instructions, a respective current predicted target address, a respective next predicted target address to be utilized for predicting a future branch execution, and a respective hotness value representing a number of target mispredictions for the associated difficult branch instruction by the count cache;
a pattern data structure having capacity for multiple target prediction entries, wherein the branch prediction unit, based on determining an actual branch target address of a particular difficult branch instruction tracked in the tracking data structure corresponds to the current predicted target address of the particular difficult branch instruction and the hotness value of the particular difficult branch instruction satisfies a prediction threshold, populates the pattern data structure with a new entry corresponding to the particular difficult branch instruction from the tracking data structure, the entry including at least the next predicted target address;
wherein the branch prediction unit is configured to:
decrement the hotness value of the particular difficult branch instruction and remove the entry from the pattern data structure based on a number of target mispredictions for the particular difficult branch instruction by the pattern data structure; and
predict a branch target address of a next execution of the particular difficult branch instruction from the pattern data structure based on the entry not being removed from the pattern data structure and otherwise predict the branch target address by reference to the count cache.

6. The processor of claim 5, wherein the particular difficult branch instruction corresponds to a branch conditional count register instruction.

7. The processor of claim 5, wherein:
the branch prediction unit further includes a hotness data structure from which the particular difficult branch instruction is promoted to the tracking data structure.

8. The processor of claim 7, wherein:
an entry in the hotness data structure includes a thread identifier for the particular difficult branch instruction, at least a portion of an instruction address for the difficult branch instruction, and a mispredict count indicating whether the entry in the hotness data structure is eligible for promotion to the tracking data structure; and
the branch prediction unit promotes the entry for the particular difficult branch instruction from the hotness data structure to the tracking data structure based on the mispredict count for the particular difficult branch instruction.

9. A data processing system, comprising:
a data storage subsystem; and
a processor coupled to the data storage subsystem, wherein the processor includes:
an instruction cache;
an execution unit that executes branch instructions to calculate target addresses; and
a branch prediction unit coupled to the instruction cache, wherein the branch prediction unit includes:
a count cache;
a tracking data structure including entries that record information regarding multiple difficult branch instructions whose target addresses have been mispredicted by the count cache, wherein the information includes, for each of the difficult branch instructions, a respective current predicted target address, a respective next predicted target address to be utilized for predicting a future branch execution, and a respective hotness value representing a number of target mispredictions for the associated difficult branch instruction by the count cache;
a pattern data structure having capacity for multiple target prediction entries, wherein the branch prediction unit, based on determining an actual branch target address of a particular difficult branch instruction tracked in the tracking data structure corresponds to the current predicted target address of the particular difficult branch instruction and the hotness value of the particular difficult branch instruction satisfies a prediction threshold, populates the pattern data structure with a new entry corresponding to the particular difficult branch instruction from the tracking data structure, the entry including at least the next predicted target address;
wherein the branch prediction unit is configured to:
decrement the hotness value of the particular difficult branch instruction and remove the entry from the pattern data structure based on a number of target mispredictions for the particular difficult branch instruction by the pattern data structure; and
predict a branch target address of a next execution of the particular difficult branch instruction from the pattern data structure based on the entry not being removed from the pattern data structure and otherwise predict the branch target address by reference to the count cache.

10. The data processing system of claim 9, wherein the particular difficult branch instruction corresponds to a branch conditional count register instruction.

11. The data processing system of claim 9, wherein the branch prediction unit further includes a hotness data structure from which the particular difficult branch instruction is promoted to the tracking data structure.

12. The data processing system of claim 11, wherein:
an entry in the hotness data structure includes a thread identifier for the particular difficult branch instruction, at least a portion of an instruction address for the difficult branch instruction, and a mispredict count indicating whether the entry in the hotness data structure is eligible for promotion to the tracking data structure; and
the branch prediction unit promotes the entry for the particular difficult branch instruction from the hotness data structure to the tracking data structure based on the mispredict count for the particular difficult branch instruction.

* * * * *